(12) United States Patent
Jung et al.

(10) Patent No.: US 9,148,588 B2
(45) Date of Patent: Sep. 29, 2015

(54) METHOD FOR DUAL RECORDING SHOOTING AND ELECTRONIC DEVICE THEREOF

(71) Applicant: Samsung Electronics Co., Ltd., Suwon-si, Gyeonggi-do (KR)

(72) Inventors: Heung-Sik Jung, Suwon-si (KR); Moon-Soo Kim, Seoul (KR); Yong-Gu Lee, Seoul (KR); Hong-Suk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 14/182,691

(22) Filed: Feb. 18, 2014

(65) Prior Publication Data

US 2014/0232905 A1    Aug. 21, 2014

(30) Foreign Application Priority Data

Feb. 21, 2013    (KR) .......................... 10-2013-0018601

(51) Int. Cl.
| | |
|---|---|
| *H04N 5/228* | (2006.01) |
| *H04N 5/232* | (2006.01) |
| *H04N 5/33* | (2006.01) |
| *H04N 7/18* | (2006.01) |
| *H04N 5/225* | (2006.01) |
| *G06K 9/00* | (2006.01) |
| *H04N 5/265* | (2006.01) |
| *H04N 5/262* | (2006.01) |

(52) U.S. Cl.
CPC ............ *H04N 5/265* (2013.01); *H04N 5/2258* (2013.01); *H04N 5/23293* (2013.01); *H04N 5/2621* (2013.01)

(58) Field of Classification Search
CPC ..... H04N 5/3415; H04N 5/343; H04N 5/345; H04N 3/1593; H04N 2013/0088; G03B 37/04
USPC .............. 348/143–159, 211.1–211.99, 220.1, 348/169–172, 239, 333.01–333.13; 382/103, 181
See application file for complete search history.

(56) References Cited

U.S. PATENT DOCUMENTS

| | | | |
|---|---|---|---|
| 8,400,548 B2 * | 3/2013 | Bilbrey et al. ........... | 348/333.01 |
| 9,007,429 B2 * | 4/2015 | Matsumoto et al. ........... | 348/36 |
| 2005/0046740 A1 * | 3/2005 | Davis ............................ | 348/373 |
| 2007/0057866 A1 * | 3/2007 | Lee et al. ....................... | 345/1.1 |

(Continued)

FOREIGN PATENT DOCUMENTS

JP    2011-250340 A    12/2011

*Primary Examiner* — Chia-Wei A Chen
(74) *Attorney, Agent, or Firm* — Jefferson IP Law, LLP

(57) ABSTRACT

A method and an apparatus for dual recording shooting in an electronic device including a dual camera are provided. The method includes acquiring a first picture from a first camera that is in an operation state, acquiring a second picture from a second camera that is in a wait state, outputting the first picture at a first resolution, downscaling the second picture to a second resolution, outputting the second picture downscaled to the second resolution, and synthesizing the first picture and the second picture that is downscaled to the second resolution and previewing the synthesized result, using a Picture In Picture (PIP) function and, when a dual recording start instruction event occurs, restoring the second picture that is downscaled to the second resolution to a previous resolution, outputting the second picture restored to the previous resolution, synthesizing the first picture and the restored second picture, and recording the synthesized result.

22 Claims, 6 Drawing Sheets

(56) References Cited

U.S. PATENT DOCUMENTS

| | | | |
|---|---|---|---|
| 2007/0147827 A1* | 6/2007 | Sheynman et al. | 396/325 |
| 2007/0292048 A1* | 12/2007 | Choe et al. | 382/286 |
| 2010/0053212 A1* | 3/2010 | Kang et al. | 345/629 |
| 2011/0187811 A1* | 8/2011 | Kim et al. | 348/14.01 |
| 2011/0188739 A1* | 8/2011 | Lee et al. | 382/154 |
| 2012/0274808 A1* | 11/2012 | Chong et al. | 348/234 |
| 2014/0177942 A1* | 6/2014 | Luo et al. | 382/154 |
| 2014/0184850 A1* | 7/2014 | Raju et al. | 348/239 |
| 2014/0192198 A1* | 7/2014 | Tsau et al. | 348/159 |
| 2014/0205191 A1* | 7/2014 | Newman | 382/166 |

\* cited by examiner

METHOD FOR DUAL RECORDING SHOOTING AND ELECTRONIC DEVICE THEREOF

CROSS-REFERENCE TO RELATED APPLICATION(S)

This application claims the benefit under 35 U.S.C. §119 (a) of a Korean patent application filed on Feb. 21, 2013 in the Korean Intellectual Property Office and assigned Serial number 10-2013-0018601, the entire disclosure of which is hereby incorporated by reference.

TECHNICAL FIELD

The present disclosure relates to a method for dual recording shooting and an electronic device thereof.

BACKGROUND

Potable terminals can provide a digital camera function to take a picture having a resolution of megapixels or more and can display the taken picture through a high resolution screen, and can have a plurality of camera modules for performing the digital camera function to provide a three-dimensional picture and/or provide a panoramic function.

On the other hand, the portable terminal can include cameras disposed and/or arranged in its front part and rear part, and can shoot, i.e. take a picture of, a user, i.e., a user face, using the camera arranged in its front part for the purpose of a self-photographing camera and can shoot the background using the camera arranged in its rear part. Further, the portable terminal can select picture data intended to be stored through a camera switching menu. That is, the portable terminal can store picture data and/or image data acquired through one of the cameras arranged in the front and rear parts.

Recently, the portable terminal can simultaneously record the background picture acquired by the camera arranged in the rear part and the user's face picture acquired by the camera arranged in the front part, as moving pictures.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for dual recording shooting in an electronic device including a dual camera.

Another aspect of the present disclosure is to provide a method and apparatus for minimizing current consumption and a delay problem when shooting a plurality of pictures in an electronic device equipped with a plurality of cameras.

Another aspect of the present disclosure is to provide a method and apparatus for downscaling a high resolution of a camera that is in a wait state to a low resolution and performing dual picture recording in an electronic device.

The above aspects are achieved by providing a method and apparatus for dual recording shooting in an electronic device including a dual camera.

In accordance with an aspect of the present disclosure, a method in an electronic device is provided. The method includes the operations of acquiring a first picture from a first camera that is in an operation state, acquiring a second picture from a second camera that is in a wait state, outputting the first picture at a first resolution, downscaling the second picture to a second resolution, outputting the second picture downscaled to the second resolution, synthesizing the first picture and the second picture that is downscaled to the second resolution and previewing the synthesized result, using a Picture In Picture (PIP) function, when a dual recording start instruction event occurs, restoring the second picture that is downscaled to the second resolution to a previous resolution, outputting the second picture restored to the previous resolution, synthesizing the first picture and the restored second picture, and recording the synthesized result. The first resolution is higher than the second resolution.

In accordance with another aspect of the present disclosure, an electronic device is provided. The electronic device includes a first camera for taking pictures, a second camera for taking pictures, at least one processor for executing computer programs, at least one memory for storing data and instructions, and at least one program stored in the memory, and constructed to be executable by the at least one processor, wherein the program includes an instruction of acquiring a first picture from the first camera that is in an operation state, acquiring a second picture from the second camera that is in a wait state, outputting the first picture at a first resolution, downscaling the second picture to a second resolution, outputting the second picture that is downscaled to the second resolution, synthesizing the first picture and the second picture that is downscaled to the second resolution and previewing the synthesized result, using a PIP function and, when a dual recording start instruction event occurs, restoring the second picture that is downscaled to the second resolution to a previous resolution, outputting the second picture restored to the previous resolution, synthesizing the first picture and the restored second picture, and recording the synthesized result. The first resolution is higher than the second resolution.

In accordance with a further aspect of the present disclosure, a method in an electronic device is provided. The method includes the operations of detecting if a dual recording shooting instruction event occurs, when the dual recording shooting instruction event does not occur, outputting a first picture from a first camera at a first resolution, downscaling a second picture to a second resolution, and outputting the second picture that is downscaled to the second resolution from the second camera, synthesizing the first picture and the second picture that is downscaled to the second resolution and previewing the synthesized result, using a PIP function and, when the dual recording start instruction event occurs, outputting a first picture from the first camera at a first resolution, restoring the second picture downscaled to the second resolution to a previous resolution, and outputting the second picture restored to the previous resolution, and synthesizing the first picture and the restored second picture and recording the synthesized result. The first resolution is higher than the second resolution.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure relates to a method for dual recording shooting using dual camera and an electronic device thereof.

Figure 1A:
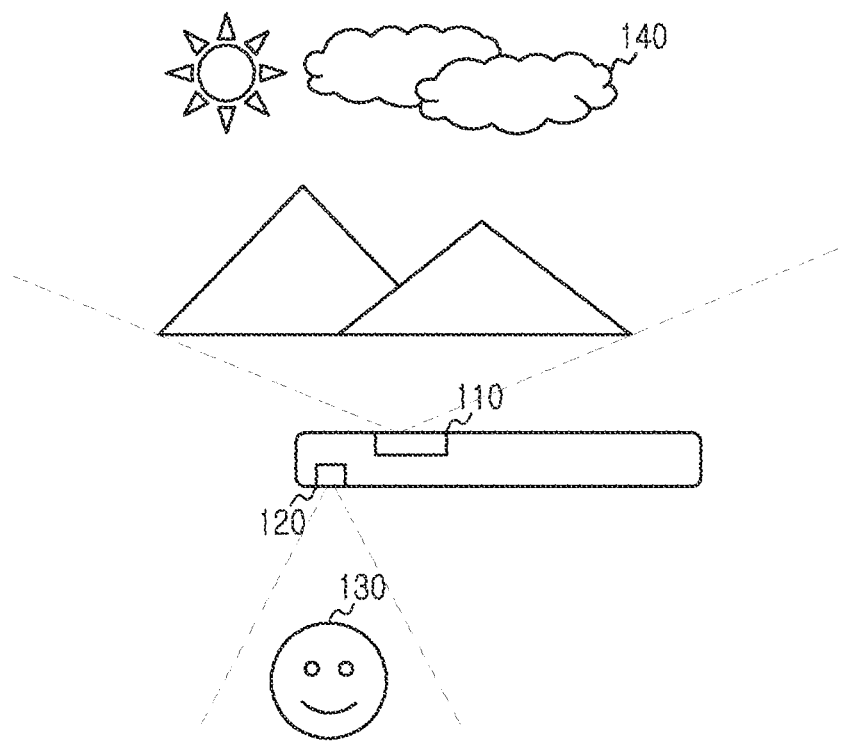
FIGS. 1A and 1B are diagrams illustrating an example of performing dual recording in a portable terminal including a dual camera according to an embodiment of the present disclosure.
Figure 1B:
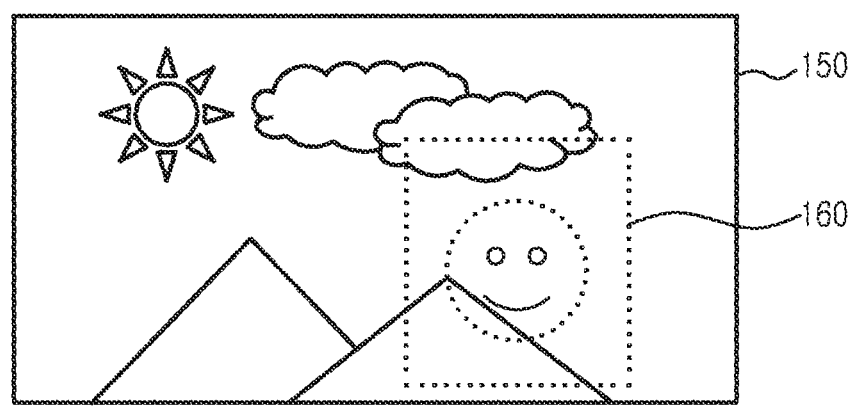

FIGS. 1A and 1B illustrate dual recording in a portable terminal including a dual camera according to an embodiment of the present disclosure.

Referring to FIG. 1A, the portable terminal has cameras 120 and 110 arranged in the portable terminal's front part and rear part, and can record a user picture 130 using the camera 120 arranged in the portable terminal's front part and record a background picture 140 using the camera 110 arranged in the portable terminal's rear part.

Referring to FIG. 1B, the portable terminal can display the background picture 140 acquired by the camera 110 that is arranged in the rear part and the portable terminal can display the user picture 130 acquired by the camera 120 that is arranged in the front part, as another background picture 150 and a user picture 160 in one screen, using a Picture In Picture (PIP) function. The PIP function is a function of simultaneously displaying a small screen apart from the original screen. The other background picture 150 becomes a mother screen, and the user picture 160 becomes a PIP. The user picture 160 can be variously arranged within the other background picture 150. Also, according to implementation, the user picture 160 may become the mother screen, and the other background picture 150 may become the PIP.

According to embodiment described above, when the portable terminal records pictures using a plurality of cameras, the portable terminal performs the recording by simultaneously turning on the plurality of cameras. And, when any one camera stops recording the picture, the stopped camera enters or transitions to a wait state.

When the portable terminal is recording the pictures using the plurality of cameras, if the portable terminal keeps tuning on the camera that has entered the wait state, there can be a problem of excessive current consumption. And, if the portable terminal turns off the camera so as to enter the wait state, a time, which may also be referred to as a 'camera startup time', for, upon input of a user instruction for simultaneous photographing, again turning on and starting up the camera that is in the wait state is needed, so there can be a problem that a delay can be caused by the camera startup time.

Accordingly, there is a need for a method and apparatus for, upon dual picture recording, minimizing power consumption and a delay caused by a camera startup time in an electronic device including a dual camera.

Below, the present disclosure describes a method and apparatus for dual recording shooting in an electronic device including a dual camera.

Figure 2A:
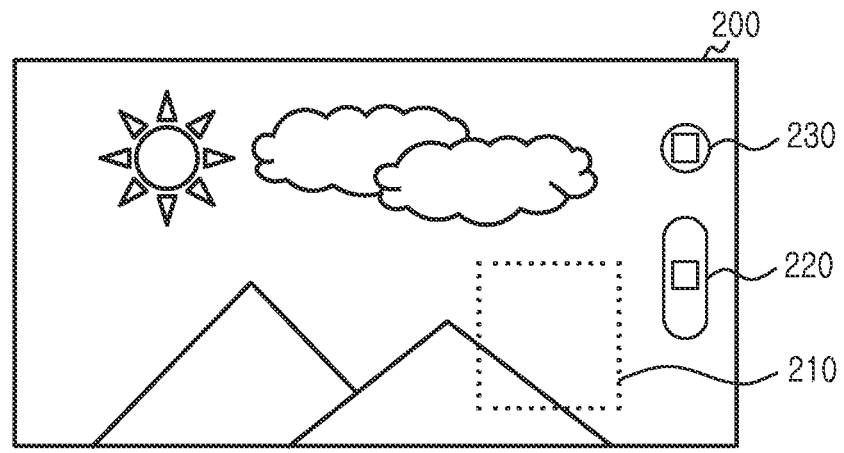
FIGS. 2A and 2B are diagrams illustrating an example of performing dual recording in a portable terminal including a dual camera according to an embodiment of the present disclosure.
Figure 2B:
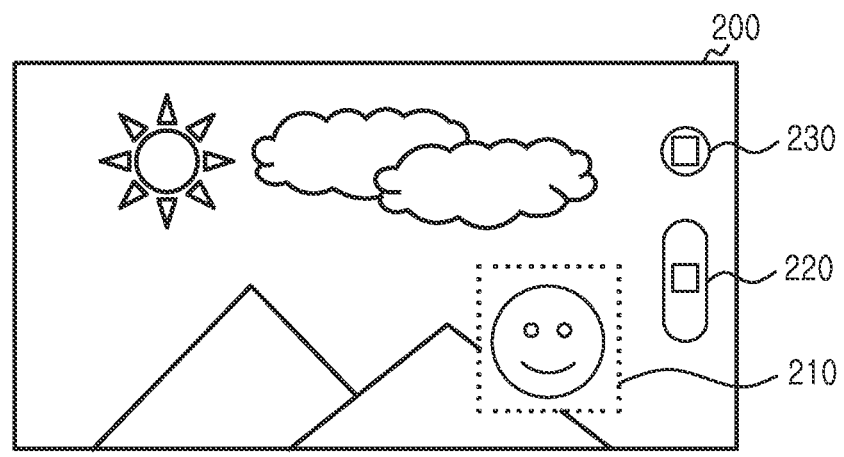

FIGS. 2A and 2B illustrate an example of performing dual recording in a portable terminal including a dual camera according to an embodiment of the present disclosure.

Referring to FIG. 2A, a diagram illustrating an example of when a first camera performs shooting but a second camera does not perform the shooting is shown. The first camera is located in a rear part of the electronic device, and the second camera is a camera located in a front part of the electronic device for self-photographing. Also, the portable terminal can display a region 210 for previewing a second picture of the second camera.

First, if a user initially executes a camera application, the first camera can be started up to start preview 200 using designated picture cells, or in other words, designated pixels, and, in a wait state, the second camera outputs the second picture having a low resolution instead of outputting the second picture having a high resolution. Accordingly, the second camera outputs the second picture having the low resolution in the wait state, but may not preview the second picture having the low resolution on a display. When the second camera does not preview the second picture of the low resolution on the display, the portable terminal may display only a frame for a location in which the second camera is to preview the second picture of the low resolution within the background picture 200.

When a first shutter 220 is touched by the user, the portable terminal can record and store the first picture of the first camera. Further, when a second shutter 230 is touched by the user, as shown in FIG. 2B, the portable terminal can start up the second camera, start the preview 210 using high resolution pixels, and can record and store the second picture of the second camera. The first and second pictures of the first and second cameras can be synthesized and can be recorded and stored as a third picture that is stored as one picture, or the first and second pictures of the first and second cameras can be recorded and stored separately.

The first shutter 220 is an instruction button, or in other words, a command and/or input button, for capturing an image from the first picture of the first camera and/or for starting recording the first picture of the first camera. The second shutter 230 is an instruction button, or in other words, a command and/or input button, for capturing an image from the second picture of the second camera and/or starting recording the second picture of the second camera.

According to an embodiment of the present disclosure, a single specific shutter (not shown) may be implemented instead of the first shutter 220 and the second shutter 230. If the single specific shutter is touched, the portable terminal can start up the first camera and the second camera and can simultaneously synthesize the first and second pictures of the first and second cameras in order to capture one image and/or simultaneously start recording the first and second pictures of the first and second cameras. At this time, the first and second pictures of the first and second cameras can be synthesized and can be recorded and stored as a third picture, or the first and second pictures of the first and second cameras can be recorded and stored separately.

According to an embodiment of the present disclosure, when the user initially executes the camera application, if the portable terminal detects respective touches on the first shutter 220 and the second shutter 230 or the user touches the single specific shutter (not shown) as in FIG. 2B, the portable terminal can simultaneously synthesize the first and second pictures of the first and second cameras to capture one image or the portable terminal can simultaneously synthesize and record the first and second pictures of the first and second cameras as a third picture.

Referring to FIG. 2B, when the first and second pictures of the first and second cameras are being simultaneously synthesized and previewed in one screen, if the second shutter 230 changes from a recording start state to a recording stop state, the second camera is changed to the wait state, and outputs the second picture having the low resolution instead of outputting the second picture having the high resolution. Accordingly, as shown in FIG. 2A, the second camera that is in the wait state outputs the second picture having the low resolution and may not preview the second picture having the low resolution on the display.

Figure 3:
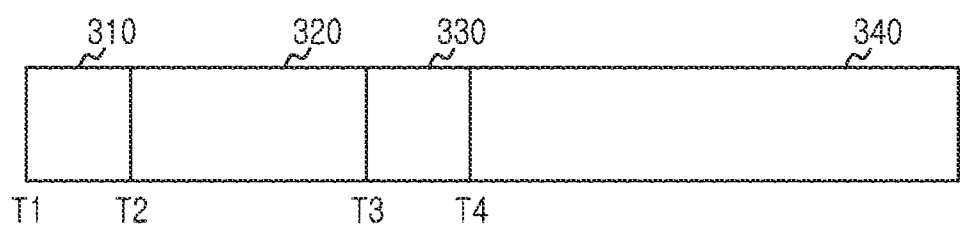
FIG. 3 is a diagram illustrating a camera operation that is time dependent on dual recording according to an embodiment of the present disclosure.

FIG. 3 is a diagram illustrating a camera operation that is time dependent on dual recording according to an embodiment of the present disclosure.

Referring to FIG. 3, at time T1, a shooting start instruction is input. After a predetermined time lapses, at time T2, shooting starts through a first camera. At time T3, a dual recording start instruction is input. At time T4, the first camera and a second camera simultaneously start recording. A time interval 310 between the time T2 and the time T1 is a startup time of the first camera during which the first camera turns on, after the shooting start instruction is input by a user, and shooting starts. A time interval 320 between the time T3 and the time T2 is an interval during which only the first camera performs shooting. A time interval 330 between the time T4 and the time T3 is a startup time of the second camera for dual recording upon input of the dual recording start instruction. A subsequent time interval 340 is a dual recording interval. In the present disclosure, the second camera that is in a wait state always starts up at a low resolution, so the time interval 330 between the time T4 and the time T3, i.e., the startup time of the second camera, becomes '0'. Therefore, the present disclosure can reduce a delay caused by the startup time of the second camera.

Figure 4:
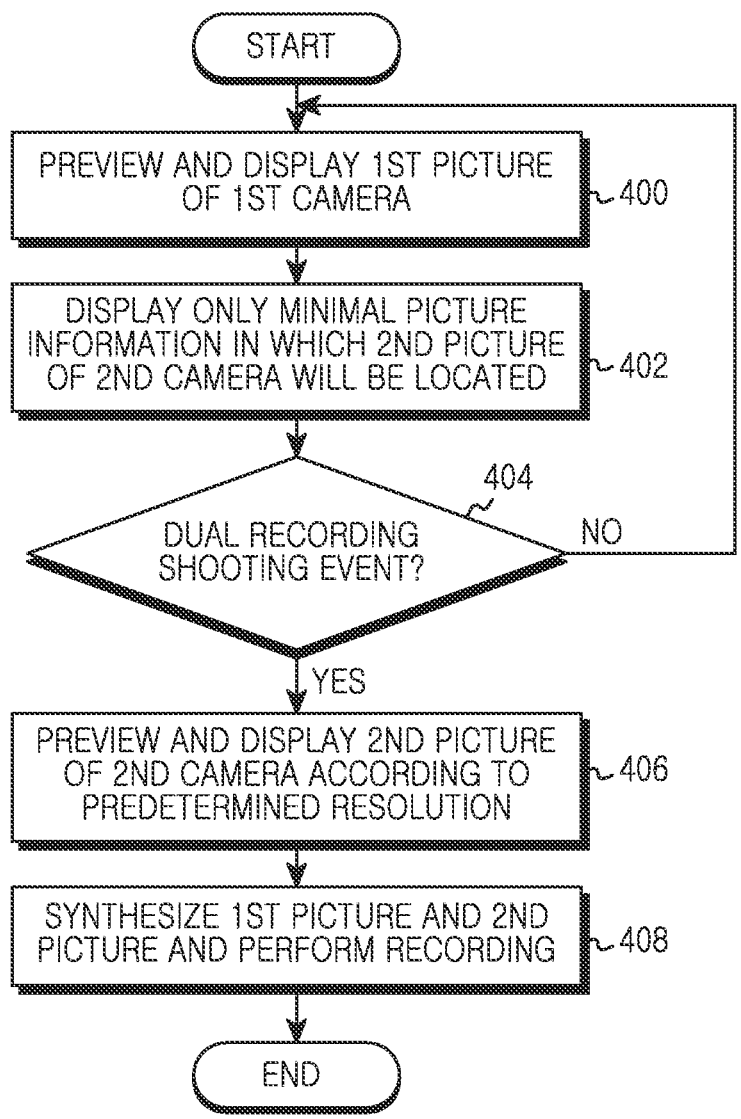
FIG. 4 is a flowchart illustrating a procedure of controlling dual recording in a portable terminal including a dual camera according to the embodiment of FIGS. 1A and 1B of the present disclosure.

FIG. 4 is a flowchart illustrating a procedure of controlling dual recording in a portable terminal including a dual camera according to the embodiment of FIGS. 1A and 1B of the present disclosure.

Referring to FIG. 4, when a camera application is executed, in operation 400, the electronic device acquires a first picture from a first camera and previews and displays the first picture of the first camera. In operation 402, the electronic device acquires a second picture from a second camera and displays only minimal picture information in which the second picture of the second camera will be located. That is, the electronic device acquires the first picture from the first camera and previews the first picture of the first camera on a screen in operation 400 and, instead of previewing the second picture of the second camera on the screen in operation 402, the electronic device can display only minimal picture information, such as a frame, in which the second picture of the second camera will be located, as shown in FIG. 2A. Accordingly, the electronic device previews the second picture in a PIP form within the first picture and can preview the second picture at a predefined minimal resolution. That is, the second picture is downscaled in resolution and is output.

After that, when a dual recording shooting event does not occur in operation 404, the electronic device returns to operation 400 and, when the dual recording shooting event occurs in operation 404, the electronic device proceeds to operation 406.

In operation 406, the electronic device previews and displays the second picture of the second camera according to a predetermined resolution, e.g., a high resolution greater than the previous resolution of operation 402. Next, in operation 408, the electronic device synthesizes the first picture and the second picture and performs recording of the synthesized result. The second picture can be output in the PIP form within the first picture. Alternatively, the first picture can be output in the PIP form within the second picture.

Though not illustrated, when the first and second pictures of the first and second cameras are being synthesized and recorded with the occurrence of the dual recording shooting event, if a dual recording shooting stop event occurs for either the first picture or the second picture, either the first picture or the second picture is changed from a high resolution to a low resolution and is output. Accordingly, either the first picture or the second picture is changed from the high resolution to the low resolution and is output, but is not previewed and only a frame for a location in which the first picture or the second picture will be previewed can be displayed.

According to an embodiment of the present disclosure, when the dual recording shooting stop event takes place, the first picture of the first camera and the second picture of the second camera can be all downscaled and output, or the first camera and the second camera can turn off by cutting off power supply to the first camera and second camera.

After that, the electronic device terminates the procedure of the present disclosure.

Figure 5:
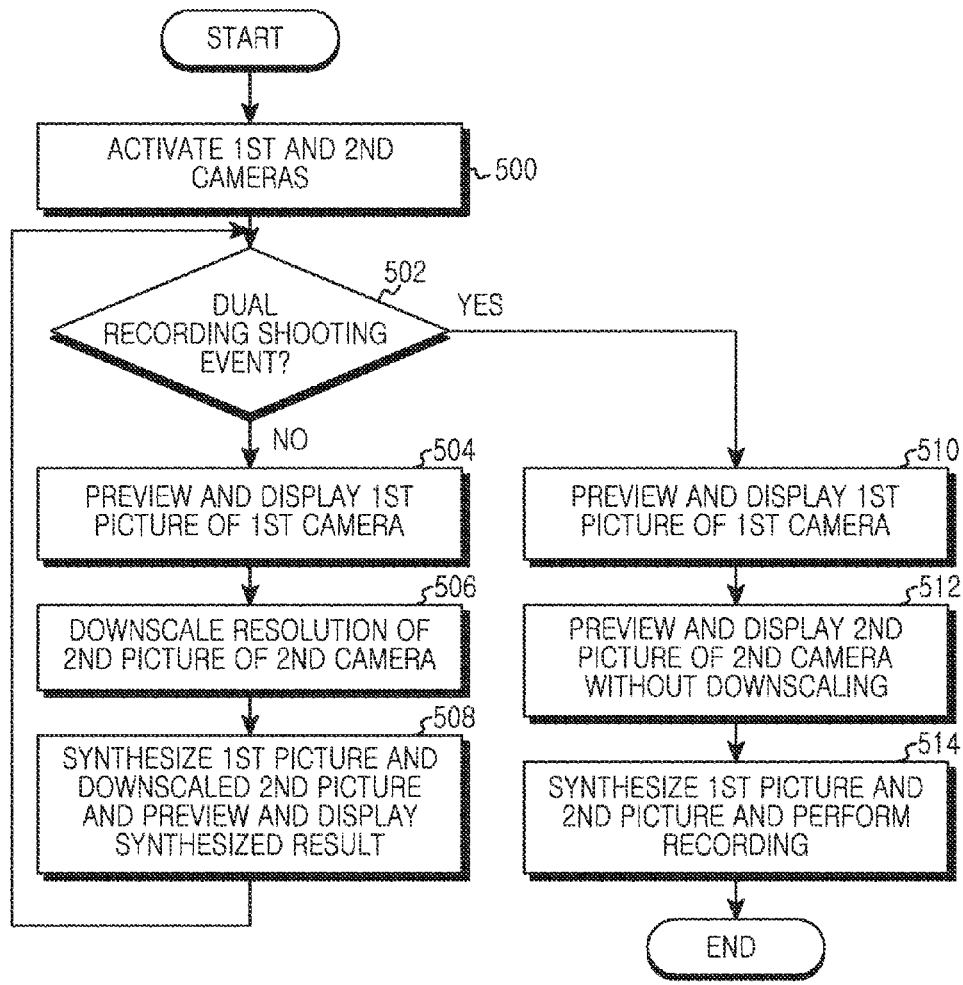
FIG. 5 is a flowchart illustrating a procedure of controlling dual recording in a portable terminal including a dual camera according to the embodiment of FIGS. 2A and 2B of the present disclosure.

FIG. 5 is a flowchart illustrating a procedure of controlling dual recording in a portable terminal including a dual camera according to the embodiment of FIGS. 2A and 2B of the present disclosure.

Referring to FIG. 5, in operation 500, when a camera application is executed, the electronic device activates a first camera and a second camera. That is, the electronic device supplies power to the first camera and the second camera such that the first camera and the second camera can operate.

Next, the electronic device, in operation 502, determines whether a dual recording shooting event occurs and/or takes place. When the electronic device determines that the dual recording shooting event does not take place in operation 502, the electronic device proceeds to operation 504. In contrast, when the electronic device determines that the dual recording shooting event occurs in operation 502, the electronic device proceeds to operation 510.

In operation 504, the electronic device acquires a first picture from the first camera and previews and displays the first picture of the first camera. In operation 506, the electronic device acquires a second picture from the second camera and displays only minimal picture information by downscaling a resolution of the second picture of the second camera. That is, the electronic device acquires the first picture from the first camera and previews the first picture of the first camera on a screen in operation 504, and, instead of previewing the second picture of the second camera on the screen in high resolution, the electronic device can display the second picture having a downscaled resolution. According to implementation, the electronic device previews the second picture in a PIP form within the first picture and can preview the second picture at a predefined minimal resolution. That is, the second picture is downscaled in resolution and is output.

Next, in operation 508, the electronic device synthesizes the first picture of the first camera and the downscaled second picture of the second camera, and previews and displays the synthesized result. The resolution of the second picture is downscaled. Generally, the higher the resolution is, the more a current consumption is, and vice versa. Also, because the electronic device maintains a low resolution in a wait state while still being supplied power, the electronic device can minimize a delay caused by a camera startup time, and can further reduce the current consumption than when maintaining a high resolution in the wait state while maintaining power. According to implementation, the resolution of the second picture may be set to a minimum pixel supported by an image sensor of the second camera, or the resolution of the second picture may be a resolution corresponding to a minimum pixel capable of detecting a mouse shape in the second picture.

In contrast, when the electronic device determines that the dual recording shooting event occurs in operation 502, in operation 510, the electronic device acquires a first picture from the first camera and previews and displays the first picture of the first camera. Next, in operation 512, the electronic device acquires a second picture from the second camera and previews and displays the second picture of the second camera without downscaling a resolution of the second picture. After that, in operation 514, the electronic device synthesizes the first picture and the second picture and performs recording of the synthesized result.

Though not illustrated, when the first and second pictures of the first and second cameras are being synthesized and recorded with the occurrence of the dual recording shooting event, if a dual recording shooting stop event occurs for either the first picture or the second picture, a respective one the first picture or the second picture is changed from a high resolution to a low resolution and is output. Accordingly, either the first picture or the second picture is changed from the high resolution to the low resolution and is output, but is not previewed, and only a frame for a location in which the first picture or the second picture will be previewed can be displayed.

According to an embodiment of the present disclosure, when the dual recording shooting stop event takes place, the first picture of the first camera and the second picture of the second camera can be all downscaled and output, or the first camera and the second camera can be turned off by cutting off power supply to the first camera and second camera.

After that, the electronic device terminates the procedure of the present disclosure.

Figure 6:
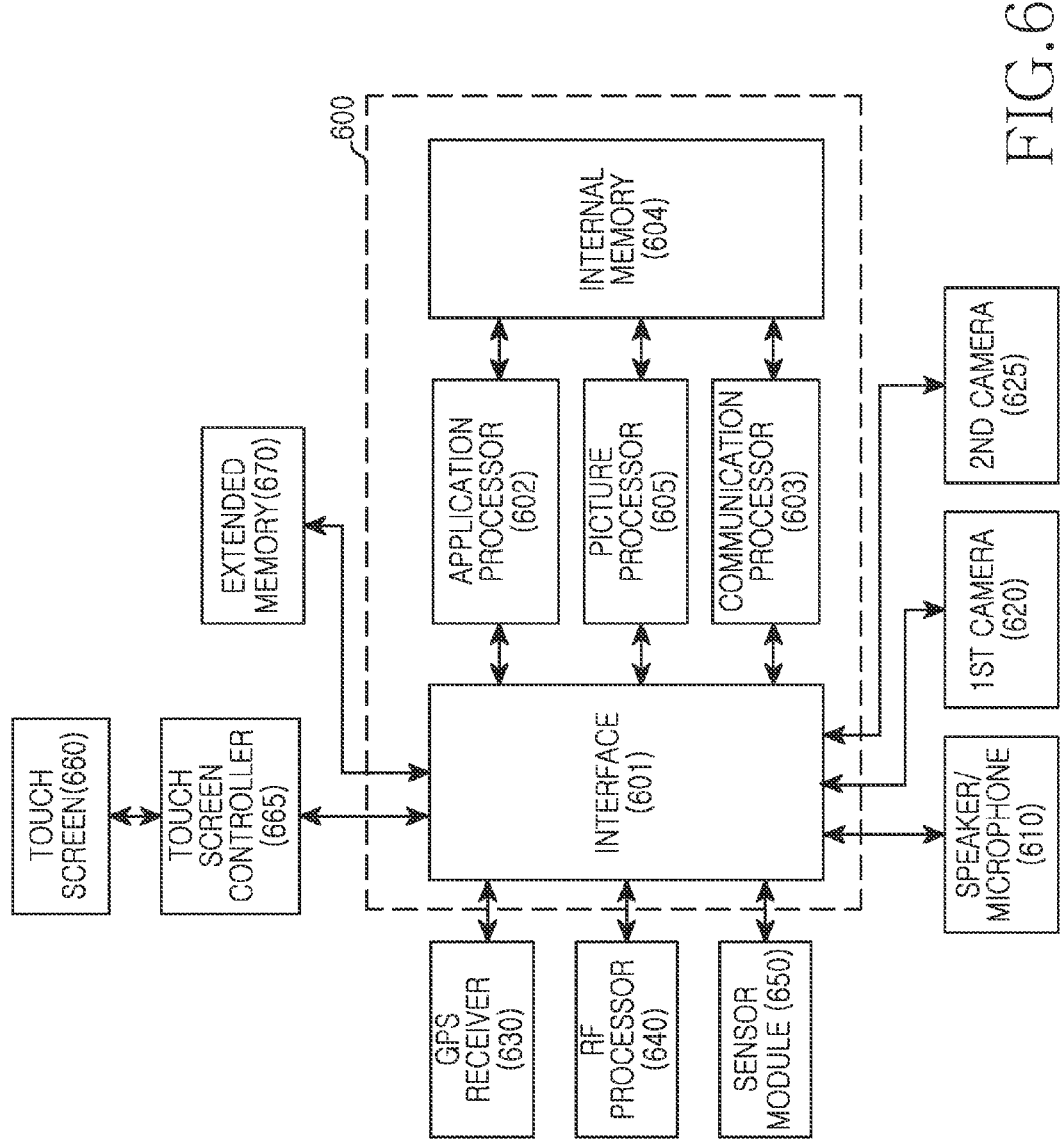
FIG. 6 is a block diagram illustrating a construction of an electronic device according to an embodiment of the present disclosure.

FIG. 6 illustrates a construction of an electronic device according to an embodiment of the present disclosure.

The electronic device can be a portable electronic device, and can be a device such as a portable terminal, a mobile terminal, a mobile pad, a media player, a tablet computer, a handheld computer, or a Personal Digital Assistant (PDA). Also, the electronic device may be any portable electronic device including a device combining two or more functions among these devices and/or may be any suitable and/or similar electronic device having at least one of a camera, a photographing function, and an image capture function.

Referring to FIG. 6, the electronic device includes a controller 600, a speaker/microphone 610, a first camera 620, a second camera 625, a Global Positioning System (GPS) receiver 630, a Radio Frequency (RF) processor 640, a sensor module 650, a touch screen 660, a touch screen controller 665, and an extended memory 670.

The controller 600 can include an interface 601, at least one processor, such as an application processor 602 and a communication processor 603, an internal memory 604, and a picture processor 605. According to cases, the entire controller 600 may be also called a processor. The interface 601, the application processor 602, the communication processor 603, the internal memory 604, and the picture processor 605 can be separate constituent elements or can be integrated into one or more integrated circuits.

The picture processor 605, which can be an Image Signal Processor (ISP), converts output data, e.g., raw data such as raw picture data and/or raw pixel data, from the first camera 620 and the second camera 625 into image frame data having a format of a predefined rule, such as a color scheme/space including Red, Green, Blue (RGB) and YUV, and provides the image frame data to the application processor 602.

The application processor 602 executes various software programs and performs various functions for the electronic device. The communication processor 603 performs processing and control for voice communication and data communication. Also, in addition to this general function, the processors 602 and 603 play even a role of executing a specific software module, i.e., an instruction set, stored in the extended memory 670 or the internal memory 604 and performing specific various functions corresponding to the module. That is, the processors 602, 603, and 605 interwork with software modules stored in the extended memory 670 or the internal memory 604, and receive picture data from the picture processor 605, and provide dual picture recording.

For example, when a camera application, which may include an instruction set, is executed, the application processor 602 acquires a first picture from a first camera and previews and displays the first picture of the first camera, and acquires a second picture from a second camera and displays only minimal picture information. That is, the application processor 602 acquires the first picture from the first camera and previews the first picture of the first camera on a screen and, instead of previewing the second picture of the second camera on the screen, the application processor 602 can display only a frame in which the second picture of the second camera will be located as shown in FIG. 2A. Accordingly, the application processor 602 previews the second picture in a PIP form within the first picture and the application processor 602 can downscale a resolution of the second picture to a predefined minimal resolution and preview the second picture at the predefined minimal resolution. When a dual recording shooting event occurs, the application processor 602 previews and displays the second picture of the second camera according to a high resolution, and synthesizes the first picture and the second picture and performs recording of the synthesized result. The second picture can be output in the PIP form within the first picture. Alternately, the first picture can be output in the PIP form within the second picture.

Further, when the first and second pictures of the first and second cameras are being synthesized and recorded according to the occurrence of the dual recording shooting event, if a dual recording shooting stop event occurs for either the first picture or the second picture, the application processor 602 changes either the first picture or the second picture from a high resolution to a low resolution and outputs either the first picture or the second picture having the low resolution. According to implementation, either the first picture or the second picture is changed from the high resolution to the low resolution and is output, but is not previewed and only a frame for a location in which the first picture or the second picture will be previewed can be displayed.

According to another embodiment of the present disclosure, when a camera application is executed, the application processor 602 activates a first camera and a second camera. That is, the application processor 602 supplies power to the first camera and the second camera such that the first camera and the second camera can operate. When a dual recording shooting event does not take place, the application processor 602 acquires a first picture from the first camera and previews and displays the first picture of the first camera, and acquires a second picture from the second camera and downscales a resolution of the second picture and displays only minimal picture information. That is, the application processor 602 acquires the first picture from the first camera and previews the first picture of the first camera on a screen and, instead of previewing the second picture of the second camera on the screen, the application processor 602 can display only a frame in which the second picture of the second camera will be located, as shown in FIG. 2A. Accordingly, the application processor 602 previews the second picture in a PIP form within the first picture and can downscale a resolution of the second picture and preview the second picture at the downscaled resolution, and the application processor 602 synthesizes the first picture of the first camera and the second picture of the second camera and previews and displays the synthesized result and the second picture is downscaled in resolution and is output.

Also, when the dual recording shooting event occurs, the application processor 602 acquires a first picture from the first camera and previews and displays the first picture of the first camera, and acquires a second picture from the second camera and, without downscaling a resolution of the second picture, previews and displays the second picture of the second camera, and synthesizes the first picture and the second picture and performs recording of the synthesized result. Further, when the first and second pictures of the first and second cameras are being synthesized and recorded according to the occurrence of the dual recording shooting event, if a dual recording shooting stop event occurs for either the first picture or the second picture, the application processor 602 changes either the first picture or the second picture from a high resolution to a low resolution and outputs either the first picture or the second picture having the low resolution. Accordingly, either the first picture or the second picture is changed from the high resolution to the low resolution and is output, but is not previewed, and only a frame for a location in which the first picture or the second picture will be previewed can be displayed.

Meantime, other processors (not shown) can include at least one data processor, image processor, codec processor, and any other similar and/or suitable processor that may be included in the electronic device. The data processor, the image processor and the codec processor may be separately constructed. Also, they may be composed of various processors performing different functions. The interface 601 is connected to the touch screen controller 665 and extended memory 670 of the electronic device.

The sensor module 650 can be coupled to the interface 601 and can enable various functions. For example, the sensor module 650 may include a motion sensor (not shown) and an optical sensor (not shown) that can be coupled to the interface 601 and can respectively sense a motion of the electronic device and sense light from the exterior of the electronic device. Besides this, a Global Positioning System (GPS) sensor and other sensors, such as a temperature sensor, a biometric sensor, or the like, can be coupled to the interface 610 and perform related functions.

The first and second cameras 620 and 625 can be coupled with the sensor module 650 through the interface 601 and can perform a camera function such as photo recording and video clip recording.

In more detail, the first camera 620 is located in a rear part of the electronic device, and the second camera 625 is located in a front part of the electronic device. Also, the first and second cameras 620 and 625 can include an optical unit, an image sensor, a signal processing unit (not shown) and the like. The optical unit may be driven by a mecha-shutter, or any other similar and/or suitable shutter driver, a motor, and an actuator, or may perform operations of zooming, focusing and the like by the actuator. The optical unit captures a peripheral image, and the image sensor senses the image captured by the optical unit and converts the sensed image into an electrical signal. The image sensor can be a Complementary Metal Oxide Semiconductor (CMOS), a Charged Coupled Device (CCD), or any other similar and/or suitable type of image sensor, and can be a high resolution image sensor. The image sensor of the camera may include a global shutter. The global shutter performs a function similar to that of the mecha-shutter that is built in the image sensor.

In an embodiment of the present disclosure, the image sensor can be a sensor capable of sensing an image of Ultra High Definition (UHD) class or more. And, the image sensed in the image sensor is converted into a digital image through the signal processing unit and is output. Output data from the plurality of cameras can be raw data.

The RF processor 640 performs a communication function. For example, under the control of the communication processor 603, the RF processor 640 converts an RF signal into a baseband signal and provides the baseband signal to the communication processor 603, or, the RF processor 640 converts a baseband signal from the communication processor 603 into an RF signal and transmits the RF signal. The communication processor 603 processes a baseband signal in various communication schemes. For example, the communication scheme can include, though is not limited to, a Global System for Mobile Communication (GSM) communication scheme, an Enhanced Data GSM Environment (EDGE) communication scheme, a Code Division Multiple Access (CDMA) communication scheme, a Wireless-Code Division Multiple Access (W-CDMA) communication scheme, a Long Term Evolution (LTE) communication scheme, an Orthogonal Frequency Division Multiple Access (OFDMA) communication scheme, a Wireless-Fidelity (Wi-Fi) communication scheme, a Wireless interoperability for Microwave Access (WiMAX) communication scheme, a Bluetooth communication scheme, or any other similar and/or suitable communication scheme.

The speaker/microphone 610 can be used for voice recognition, voice replication, digital recording, and audio stream input and output of a phone function. That is, the speaker/microphone 610 converts a voice signal into an electrical signal, or converts an electrical signal into a voice signal. Though not illustrated, a detachable earphone, headphone or headset can be connected to the electronic device through an external port.

The touch screen controller 665 can be coupled to the touch screen 660. The touch screen 660 and the touch screen controller 665 can detect a contact and a motion or an interruption of the contact by using, though not limited to, any multi-touch sensing technology including other proximity sensor arrays or other elements as well as capacitive, resistive, infrared and surface acoustic wave technologies for determining one or more contact points with the touch screen 660.

The touch screen 660 provides an input/output interface between the electronic device and a user. That is, the touch screen 660 forwards, or in other words, provides information relating to, and/or a signal corresponding to, a user's touch input to the electronic device. Also, the touch screen 660 can display an output of the electronic device to the user. That is, the touch screen 660 shows a visual output to the user. This visual output is presented in the form of a text, a graphic, a video, and a combination thereof. In an embodiment of the present disclosure, the touch screen 660 displays images taken by the first and second cameras 620 and 625 and photographing information.

The touch screen 660 can use various displays. For example, the touch screen 660 can use, although not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), a Flexible LED (FLED), or any other suitable and/or similar display type.

The GPS receiver 630 converts signals received from artificial satellites into information corresponding to position, speed, time, etc. For example, distances between the satellites and the GPS receiver 630 are determined by multiplying a speed of light and signal reaching time, and a position of the electronic device is measured in the known triangulation principle by obtaining accurate locations and distances of the three satellites.

The extended memory 670 or the internal memory 604 can include high-speed Random Access Memory (RAM) and/or non-volatile memory such as one or more magnetic disk storage devices, one or more optical storage devices, and/or flash memories, for example, Not AND (NAND) memories, Not OR (NOR) memories, or any other similar and/or suitable type of storage device and/or storage medium.

The extended memory 670 or the internal memory 604 stores software. A software constituent element includes an Operating System (OS) software module, a communication software module, a graphic software module, a user interface software module, a Moving Picture Experts Group (MPEG) module, a camera software module, at least one application software module, and the like. Also, because the module, which is a software constituent element, can be expressed as a set of instructions, the module may be also expressed as an instruction set. The module may be also expressed as a program.

Further to the present disclosure, the extended memory 670 can store images or videos taken by the first camera 620 and the second camera 625.

The OS software includes various software constituent elements controlling general system operation. Control of the general system operation represents, for example, memory management and control, storage hardware device control and management, power control and management and the like. This OS software performs even a function of making smooth communication between various hardware devices and software constituent elements and/or modules.

The communication software module can perform communication with other electronic devices such as computers, servers, and/or portable terminals through the RF processor 640. And, the communication software module is constructed in a protocol structure corresponding to a communication scheme.

The graphic software module includes various software constituent elements for providing and displaying a graphic image on the touch screen 660. The graphic image may include a text, a web page, an icon, a digital image, a video, an animation and the like.

The user interface software module includes various software constituent elements associated with a user interface. The user interface software module includes information about how a state of the user interface is changed, whether the change of the state of the user interface is carried out in which condition, or other information relating to the user interface.

The camera software module includes a camera related software constituent element enabling camera related processes and functions. The application module includes a web browser including a rendering engine, an electronic mail (e-mail), an instant message, word processing, keyboard emulation, an address book, a touch list, a widget, Digital Right Management (DRM), voice recognition, voice replication, a position determining function, a location-based service and the like. The memories 670 and 604 can include additional modules and/or instructions besides the aforementioned modules. Or, according to need, the memories 670 and 604 may not use some modules and/or instructions.

In relation to the present disclosure, the application module includes instructions for dual picture recording, as shown in FIG. 4 and FIG. 5.

For instance, when a camera application is executed, the application module acquires a first picture from a first camera and previews and displays the first picture of the first camera, and acquires a second picture from a second camera and displays only minimal picture information. That is, the application module acquires the first picture from the first camera and previews the first picture of the first camera on a screen and, instead of previewing the second picture of the second camera on the screen, can display only a frame in which the second picture of the second camera will be located, as shown in FIG. 2A. Accordingly, the application module previews the second picture in a PIP form within the first picture and can downscale a resolution of the second picture to a predefined minimal resolution and preview the second picture at the predefined minimal resolution. When a dual recording shooting event occurs, the application module previews and displays the second picture of the second camera according to a high resolution, and synthesizes the first picture and the second picture and performs recording of the synthesized result. Desirably, the second picture is output in the PIP form within the first picture. Alternately, the first picture can be output in the PIP form within the second picture.

Further, when the first and second pictures of the first and second cameras are being synthesized and recorded according to the occurrence of the dual recording shooting event, if a dual recording shooting stop event occurs for either the first picture or the second picture, the application module changes either the first picture or the second picture from having a high resolution to having a low resolution and outputs either the first picture or the second picture changed to having the low resolution. Accordingly, either the first picture or the second picture is changed from having the high resolution to having the low resolution and is output, but is not previewed, and only a frame for a location in which the first picture or the second picture will be previewed can be displayed.

According to another embodiment, when a camera application is executed, the application module activates a first camera and a second camera. That is, the application module supplies power to the first camera and the second camera such that the first camera and the second camera can operate. When a dual recording shooting event does not take place, the application module acquires a first picture from the first camera and previews and displays the first picture of the first camera, and acquires a second picture from the second camera and downscales a resolution of the second picture and displays only minimal picture information. That is, the application module acquires the first picture from the first camera and previews the first picture of the first camera on a screen and, instead of previewing the second picture of the second camera on the screen, the application module can display only a frame in which the second picture of the second camera will be located, as shown in FIG. 2A. Accordingly, the application module previews the second picture in a PIP form within the first picture but can downscale a resolution of the second picture and preview the second picture at the downscaled resolution, and the application module synthesizes the first picture of the first camera and the second picture of the second camera and previews and displays the synthesized result and the second picture is downscaled in resolution and is output.

Also, when the dual recording shooting event occurs, the application module acquires a first picture from the first camera and previews and displays the first picture of the first camera, and acquires a second picture from the second camera and, without downscaling a resolution of the second picture, previews and displays the second picture of the second camera, and synthesizes the first picture and the second picture and performs recording of the synthesized result. Further, when the first and second pictures of the first and second cameras are being synthesized and recorded with the occurrence of the dual recording shooting event, if a dual recording shooting stop event occurs for either the first picture or the second picture, the application module changes either the first picture or the second picture from a high resolution to a low resolution and outputs either the first picture or the second picture that has been changed into the low resolution. Accordingly, either the first picture or the second picture is changed from the high resolution to the low resolution and is output, but is not previewed, and only a frame for a location in which the first picture or the second picture will be previewed can be displayed.

Also, various functions of the electronic device according to the present disclosure mentioned above and to be mentioned below can be executed by hardware including one or more processing and/or Application Specific Integrated Circuits (ASICs), and/or software, and/or a combination of them.

The above description has been made in which an embodiment of the present disclosure is applied to a portable terminal, but the embodiment of the present disclosure is applicable to a dual camera device or any similar and/or suitable electronic device having more than one camera. Also, an embodiment of the present disclosure has been described in which a first camera and a second camera are located in front and rear of an electronic device. But, according to another implementation, the first camera and the second camera can be in the same location.

It will be appreciated that various embodiments of the present disclosure according to the claims and description in the specification can be realized in the form of hardware, software or a combination of hardware and software. Any such software may be stored in a non-transient computer readable storage medium. The non-transient computer readable storage medium stores at least one program, which may also be referred to as a software module, the at least one program comprising instructions, which when executed by at least one processor in an electronic device, cause the electronic device to perform a method of the present disclosure. Any such software may be stored in the form of volatile or non-volatile storage such as, for example, a storage device like a Read Only Memory (ROM), whether erasable or rewritable or not, or in the form of memory such as, for example, RAM, memory chips, a hardware device or integrated circuits or on an optically or magnetically readable medium such as, for example, a Compact Disk (CD), a Digital Versatile Disk (DVD), a magnetic disk, a magnetic tape or the like. It will be appreciated that the storage devices and storage media are various embodiments of machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and various embodiments suitably encompass the same.

As described above, various embodiments of the present disclosure can minimize power consumption and a startup time delay by downscaling a high resolution of a camera in a wait state to a low resolution and performing dual recording in an electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising the operations of:
acquiring a first picture from a first camera that is in an operation state;
acquiring a second picture from a second camera that is in a wait state;
outputting the first picture at a first resolution;
downscaling the second picture to a second resolution;
outputting the second picture downscaled to the second resolution;
synthesizing the first picture and the second picture that is downscaled to the second resolution and previewing the synthesized result using a Picture In Picture (PIP) function;
when a dual recording start instruction event occurs, restoring the second picture that is downscaled to the second resolution to a previous resolution;
outputting the second picture restored to the previous resolution; and synthesizing the first picture and the restored second picture, and recording the synthesized result,
wherein the first resolution is higher than the second resolution.

2. The method of claim 1, wherein the second resolution of the second picture is a resolution lower than the previous resolution of the second camera, and
wherein a current consumption is greater when the second picture is output at the previous resolution than when the second picture is output at the second resolution.

3. The method of claim 1, wherein the second resolution of the second picture is a resolution lower than the previous resolution of the second camera, and
wherein the second resolution is set to a minimum pixel supported by an image sensor of the second camera.

4. The method of claim 1, wherein the second resolution of the second picture is a resolution lower than the previous resolution of the second camera, and
wherein the second resolution is a resolution corresponding to a minimum pixel capable of detecting a mouse shape of a subject.

5. The method of claim 1, further comprising, while synthesizing the first picture and the restored second picture and recording the synthesized result, upon occurrence of a dual recording stop instruction event, outputting the first picture at the first resolution, downscaling the restored second picture to the second resolution, outputting the second picture that is downscaled to the second resolution, and synthesizing the first picture and the second picture that is downscaled to the second resolution and previewing the synthesized result, using the PIP function.

6. The method of claim 5, wherein the dual recording stop instruction event occurs when a mouse shape is not detected from a subject of the second picture, or occurs when an object corresponding to a dual recording stop instruction is selected.

7. The method of claim 5, wherein the dual recording stop instruction event occurs when a user inputs a dual recording stop instruction to the electronic device.

8. The method of claim 1, wherein the dual recording start instruction event occurs when a mouse shape is detected from a subject of the second picture, or occurs when an object corresponding to a dual recording start instruction is selected.

9. An electronic device comprising:
a first camera for taking pictures;
a second camera for taking pictures;
at least one processor for executing computer programs;
at least one memory for storing data and instructions; and
at least one program stored in the memory, and constructed to be executable by the at least one processor,
wherein the program comprises an instruction of:
acquiring a first picture from the first camera that is in an operation state;
acquiring a second picture from the second camera that is in a wait state;
outputting the first picture at a first resolution;
downscaling the second picture to a second resolution;
outputting the second picture downscaled to the second resolution;
synthesizing the first picture and the second picture that is downscaled to the second resolution and previewing the synthesized result, using a Picture In Picture (PIP) function; and
when a dual recording start instruction event occurs, restoring the second picture that is downscaled to the second resolution to a previous resolution;
outputting the second picture restored to the previous resolution;
synthesizing the first picture and the restored second picture, and recording the synthesized result,
wherein the first resolution is higher than the second resolution.

10. The electronic device of claim 9, wherein the second resolution of the second picture is a resolution lower than the previous resolution of the second camera, and
wherein a current consumption is greater when the second picture is output at the previous resolution than when the second picture is output at the second resolution.

11. The electronic device of claim 9, wherein the second resolution of the second picture is a resolution lower than the previous resolution of the second camera, and
wherein the second resolution is set to a minimum pixel supported by an image sensor of the second camera.

12. The electronic device of claim 9, wherein the second resolution of the second picture is a resolution lower than the previous resolution of the second camera, and
wherein the second resolution is a resolution corresponding to a minimum pixel capable of detecting a mouse shape of a subject.

13. The electronic device of claim 9, wherein, while synthesizing the first picture and the restored second picture and recording the synthesized result, upon occurrence of a dual recording stop instruction event, the program further comprises an instruction of outputting the first picture at the first resolution, downscaling the restored second picture to the second resolution, outputting the second picture that is downscaled to the second resolution, and synthesizing the first picture and the second picture that is downscaled to the second resolution and previewing the synthesized result, using the PIP function.

14. The electronic device of claim 13, wherein the dual recording stop instruction event occurs when a mouse shape is not detected from a subject of the second picture, or occurs when an object corresponding to a dual recording stop instruction is selected.

15. The electronic device of claim 9, wherein the dual recording start instruction event occurs when a mouse shape is detected from a subject of the second picture, or occurs when an object corresponding to a dual recording start instruction is selected.

16. The electronic device of claim 9, wherein a dual recording stop instruction event occurs when a user inputs a dual recording stop instruction to the electronic device.

17. A method in an electronic device, the method comprising the operations of:
detecting if a dual recording shooting instruction event occurs;
when the dual recording shooting instruction event does not occur, outputting a first picture from a first camera at a first resolution, downscaling a second picture to a second resolution, and outputting the second picture downscaled to the second resolution from a second camera;
synthesizing the first picture and the second picture that is downscaled to the second resolution and previewing the synthesized result, using a Picture In Picture (PIP) function;
when the dual recording start instruction event occurs, outputting a first picture from the first camera at a first resolution, restoring the second picture that is downscaled to the second resolution to a previous resolution, and outputting the second picture restored to the previous resolution; and
synthesizing the first picture and the restored second picture and recording the synthesized result, wherein the first resolution is higher than the second resolution.

18. The method of claim 17, wherein the second resolution of the second picture is a resolution lower than the previous resolution of the second camera, and
wherein a current consumption is greater when the second picture is output at the previous resolution than when the second picture is output at the second resolution.

19. The method of claim 17, wherein the second resolution of the second picture is a resolution lower than the previous resolution of the second camera, and
wherein the second resolution is set to a minimum pixel supported by an image sensor of the second camera.

20. The method of claim 17, wherein the second resolution of the second picture is a resolution lower than the previous resolution of the second camera, and
wherein the second resolution is a resolution corresponding to a minimum pixel capable of detecting a mouse shape of a subject.

21. The method of claim 17, further comprising, while synthesizing the first picture and the restored second picture and recording the synthesized result, upon occurrence of a dual recording stop instruction event, outputting the first picture at the first resolution, downscaling the restored second picture to the second resolution, outputting the second picture that is downscaled to the second resolution, and synthesizing the first picture and the second picture that is downscaled to the second resolution and previewing the synthesized result, using the PIP function,
wherein the dual recording stop instruction event occurs when a mouse shape is not detected from a subject of the second picture, or occurs when an object corresponding to a dual recording stop instruction is selected.

22. The method of claim 17, wherein the dual recording start instruction event occurs when a mouse shape is detected from a subject of the second picture, or occurs when an object corresponding to a dual recording start instruction is selected.

* * * * *